UNITED STATES PATENT OFFICE.

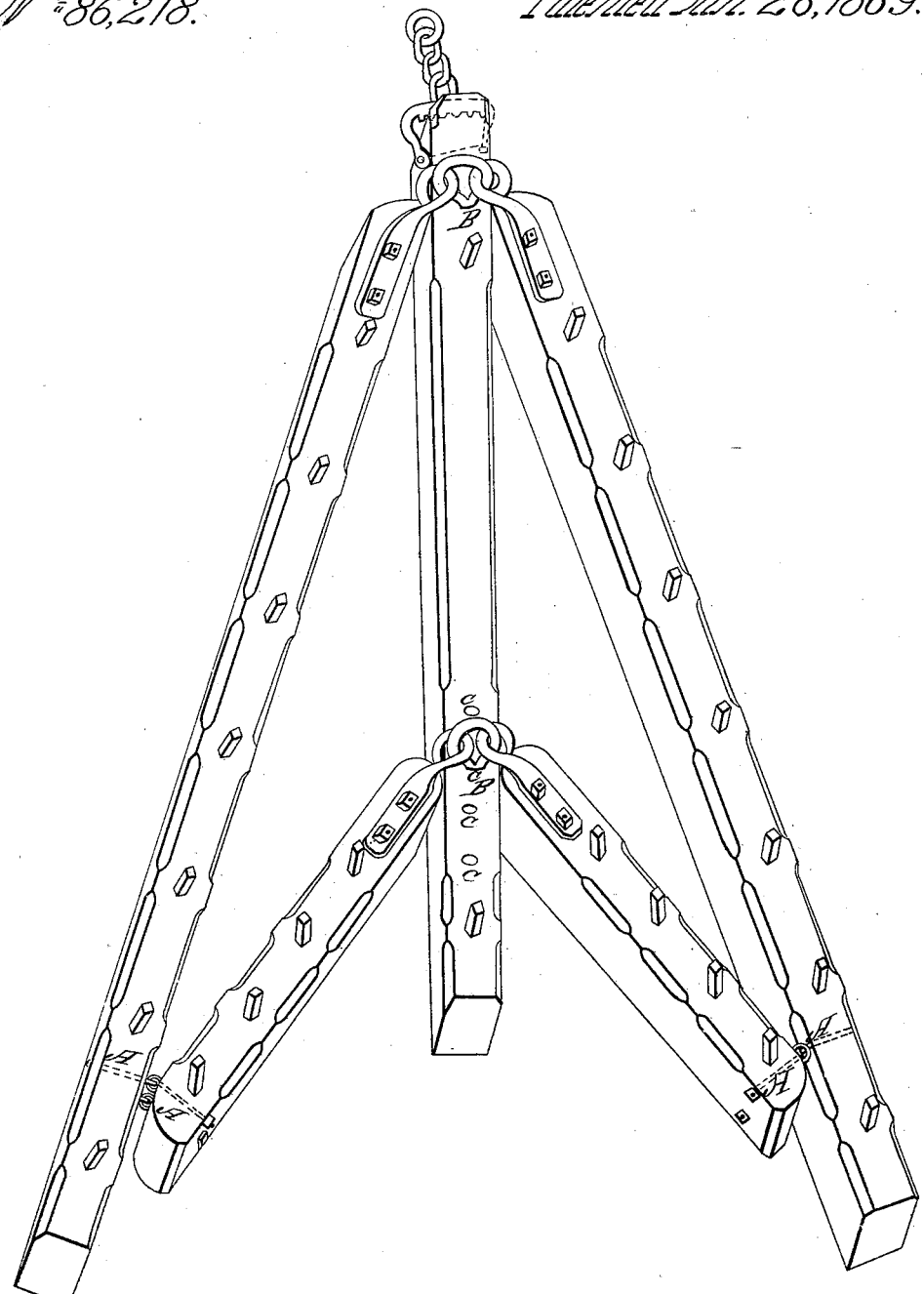

THOMAS H. EULASS, OF MASON CITY, ILLINOIS.

IMPROVEMENT IN HARROWS.

Specification forming part of Letters Patent No. 86,218, dated January 26, 1869.

*To all whom it may concern:*

Be it known that I, THOMAS H. EULASS, of Mason City, in the county of Mason and State of Illinois, have invented a new and useful Mode for Folding and Adjusting Harrows; and I do hereby declare that the following is a full, clear, and exact description of the construction and operation of the same, reference being had to the annexed drawing, making a part of the specification.

I use a single draft-beam, and attach to it, on each side, two folding wings, by means of the link-hinges A A, one on each side of the draft-beam, near the forward end, and a shorter one on each side, near the rear end of said draft-beam.

The two wings on the same side of the draft-beam are connected together by means of the double-link hinge B B.

The double-link hinge, as shown at letter A in the accompanying drawing, is for the purpose of allowing the harrow to be adjusted to any given width.

The link-hinge B B is for the purpose of allowing the harrow to be adjusted or folded at the pleasure of the operator.

The holes C C C are for the adjusting-bolt of the link-hinge B to be inserted when expanding or contracting the harrow.

What I claim as my invention, and desire to secure by Letters Patent, is—

1. A harrow consisting of a single draft-beam and folding wings, hinged together in the manner herein described, and for the purposes set forth.

2. The application of the double-link hinge A A and the link-hinge B B to harrows, for the purpose of adjusting and folding them.

THOMAS H. EULASS.

Witnesses:
GEORGE W. DIETRICH,
ISRAEL HIBBERD.